United States Patent
Mamy et al.

(10) Patent No.: US 8,402,937 B2
(45) Date of Patent: Mar. 26, 2013

(54) COMBUSTION ENGINE CYLINDER HEAD INTAKE DUCT AND METHOD OF MANUFACTURE

(75) Inventors: Laurence Mamy, Versailles (FR); Thierry Perroquin, Bailly-Romainvilliers (FR)

(73) Assignee: Renault s.a.s., Boulogne-Billancourt (FR)

( * ) Notice: Subject to any disclaimer, the term of this patent is extended or adjusted under 35 U.S.C. 154(b) by 393 days.

(21) Appl. No.: 12/594,473

(22) PCT Filed: Mar. 25, 2008

(86) PCT No.: PCT/FR2008/050515
§ 371 (c)(1),
(2), (4) Date: Mar. 3, 2010

(87) PCT Pub. No.: WO2008/132405
PCT Pub. Date: Nov. 6, 2008

(65) Prior Publication Data
US 2010/0147249 A1    Jun. 17, 2010

(30) Foreign Application Priority Data
Apr. 2, 2007    (FR) ...................................... 07 54205

(51) Int. Cl.
*F02F 1/42*    (2006.01)
*F02B 31/04*    (2006.01)

(52) U.S. Cl. ..................................................... 123/193.5
(58) Field of Classification Search ............... 123/193.5, 123/295, 301, 306
See application file for complete search history.

(56) References Cited

U.S. PATENT DOCUMENTS

| | | | | |
|---|---|---|---|---|
| 5,257,612 A | * | 11/1993 | Smith et al. | 123/661 |
| 6,418,905 B1 | * | 7/2002 | Baudlot et al. | 123/301 |
| 6,854,440 B2 | * | 2/2005 | Cathcart et al. | 123/298 |
| 7,762,229 B2 | * | 7/2010 | Abe et al. | 123/306 |
| 2004/0221830 A1 | | 11/2004 | Kuehner et al. | |
| 2007/0227495 A1 | * | 10/2007 | Isaji et al. | 123/306 |

FOREIGN PATENT DOCUMENTS

EP    1 344 926 A2    9/2003

* cited by examiner

*Primary Examiner* — M. McMahon
(74) *Attorney, Agent, or Firm* — Oblon, Spivak, McClelland, Maier & Neustadt, L.L.P.

(57) ABSTRACT

An intake duct cast as a recess in a combustion engine cylinder head that opens into a combustion chamber thereof at its lower end via an annular valve-seat housing. The intake duct, over part of its length, includes a substantially planar underside connected to the housing via a transition region that defines a shrinkage void of rounded shape within the mass of the cylinder head.

9 Claims, 2 Drawing Sheets

BACKGROUND ART

COMBUSTION ENGINE CYLINDER HEAD INTAKE DUCT AND METHOD OF MANUFACTURE

BACKGROUND

The present invention relates to the technical field of combustion engines, and more particularly to the design of cylinder head intake ducts and to the associated sizing machining.

The subjects of the present invention are an intake duct, a cylinder head exhibiting at least one such intake duct, the method of manufacturing it, and an engine equipped with such a cylinder head.

This invention finds a favored, but nonexclusive, application in spark-ignition engines.

In spark-ignition engines, there is a desire to generate within the combustion chambers a structured aerodynamic of the "tumble" type (rotational movement about an axis perpendicular to the inter-intake valves plane).

It is desirable to be able to make the best possible use of this turbulence, particularly at the time of ignition, because it ensures greater combustion speeds, particularly under part load conditions. The turbulence therefore increases the potential for dilution with residual burnt gases in the chamber, and this results directly in a saving on fuel consumption. Furthermore, the "tumble" makes it possible to operate at a great deal less advance under cold start conditions, and thus to recover heat from the exhaust, for catalytic converter light off. Finally, for full load at low speed, the "tumble" also speeds up combustion, making it possible to operate with a great deal less ignition advance, while at the same time repelling pinging.

In general, the aim is to obtain an aerodynamic "tumble" movement of a certain intensity, while at the same time maintaining enough permeability to ensure the level of performance of the engine. The shape of the duct has also to fulfill the functionalities of fuel consumption and pollution reduction, when demands are made on the engine. Finally, it has also to be simple to produce and robust in its manufacture.

The fact of the matter is that the four main functionalities to be optimized in an engine (pollution reduction, response to demand, fuel consumption and pinging) are closely connected with the "tumble" and require a great deal of robustness in the manufacture of the engine. The geometric shapings of the intake duct with a view to achieving an aerodynamic package of the "tumble" type have therefore to be particularly robust with regard to casting spread. Such ducts must not under any circumstance introduce disparities in aerodynamic intensity, or in permeability, as these would be to the detriment of the functionalities of pollution reduction, fuel consumption and performance.

In order not to generate too pronounced a step or a ramp which would cause a drop in permeability, the bottom part of the duct casting is generally produced round, so that it mates well with the ogiva machining tool, which of necessity is round. Now, square ducts encourage "tumble". The shape of the duct has therefore to incorporate a transition zone, forming the transition between a square section and a round section.

Publication JP2003214169 describes an intake duct of the "tumble" type which, in cross section, has a recess in the duct casting. This recess forms a ramp which guides the airstream toward the front of the valve. A ramp such as this is admittedly favorable to the swirling movement of the intake air, but creates too great a deviation on the airstream not to have any effect on the flow of the air.

BRIEF SUMMARY

It is an aim of the present invention to direct the flow in as straight a line as possible in order to encourage front-of-valve flow rate with respect to rear-of-valve, without impairing the permeability of the duct.

To this end, the present invention proposes that the duct casting should have, over part of its length, a substantially planar lower face connected to the housing by a rounded transition zone, delineating a void in the mass of the cylinder head.

For preference, the void is confined to the foot of the lower face of the duct, and it is revealed, by machining, within the mass of the cylinder head casting.

The present invention allows a good connection between the duct casting and the ogive, and makes it possible to maintain a pronounced flat as far as the ogive, which is beneficial in generating "tumble".

Manufacture of the cylinder head may notably include:
 a first step of casting, defining at least an as-cast intake duct with a planar lower face, connecting to an annular valve seat housing by a rounded connecting zone that continues towards the inside of the duct,
 a second step of sizing the duct at its lower end.

BRIEF DESCRIPTION OF THE DRAWINGS

Other features and advantages of the invention will become clearly apparent from reading the following description of one nonlimiting exemplary embodiment thereof, with reference to the attached drawings in which.

DETAILED DESCRIPTION

Figure 1:
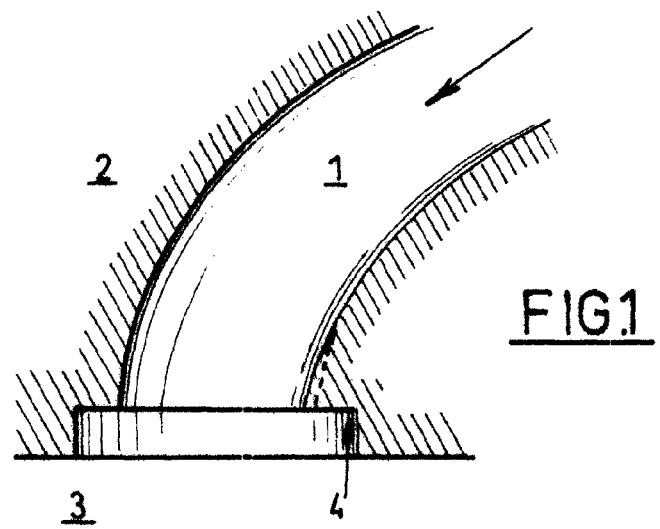
FIG. 1 is a cross section through a cylinder head showing a known duct casting.

In the sectional view of FIG. 1, there may be seen a bent intake duct 1, which opens via its lower end into a combustion chamber 3 of the cylinder head 2. A duct such as this is cast as a recess in the engine cylinder head and opens into the chamber 3 thereof at its lower end, via an annular valve seat housing 4. The valve seat itself has not been depicted. FIG. 1 shows an as-cast duct, that is to say the duct obtained from the casting of the cylinder head, prior to the conventional operation of machining the region where it meets the combustion chamber 3.

Figure 2:
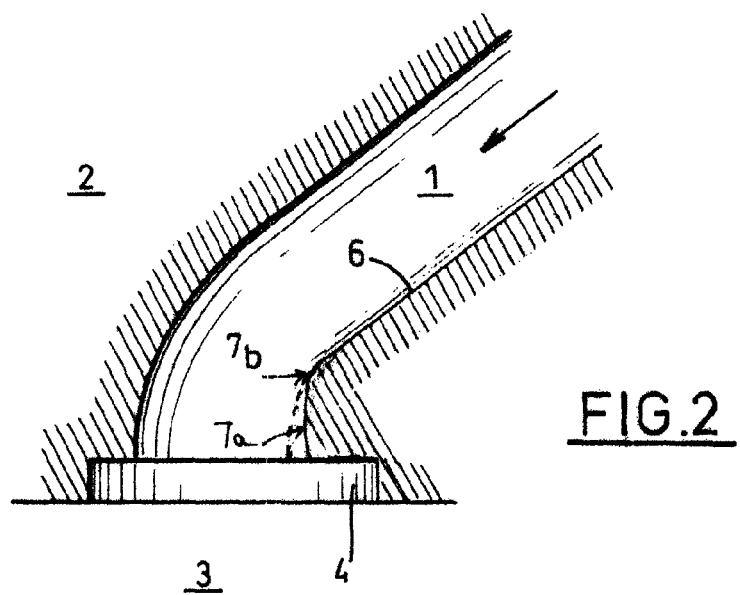
FIG. 2 is a cross section through a cylinder head showing the duct casting of the invention.

FIG. 2 also shows an as-cast duct. Here, the duct 1 also delineates a bend, before opening into the chamber 3, but over part of its length has a straight portion. The lower face 6a of the duct is substantially planar, as is its upper face 6b. The lower face 6a is connected to the valve seat housing 4 by a rounded fillet 7b: this rounded transition region 7b, continues toward the center of the duct, and delineates a void, which follows on from the latter in the direction of the valve seat.

Figure 3:
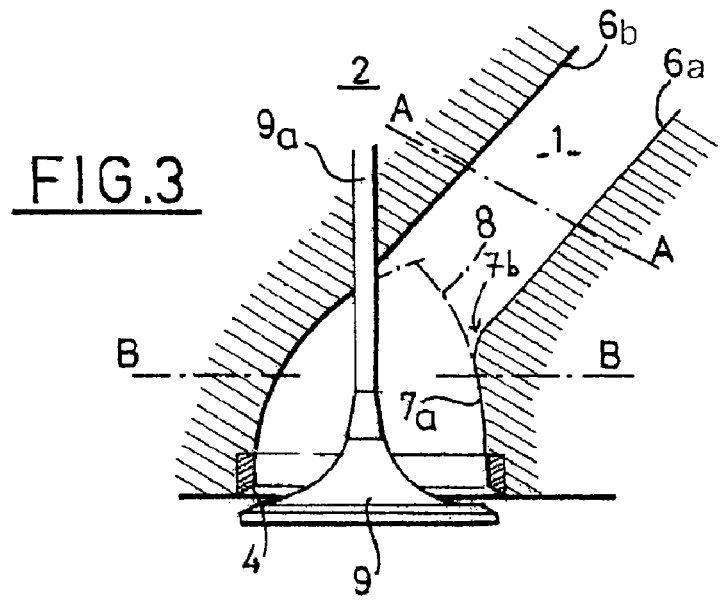
FIG. 3 shows the machined shape of the same duct.

FIG. 3 shows the same duct 1 as in FIG. 2, after its lower end has been sized using a machining ogive 8, the profile of which is indicated in broken line. The diagram also shows the valve 9, with its valve stem 9a. By comparison with FIG. 2, the machining of the duct 1 has revealed a void 7a, of rounded shape, in the mass of the cylinder head 2, in the region of the "boss" 7b. The void 7a forms a transition between the lower face 6a of the duct, and the valve seat housing 4.

Figure 3A:
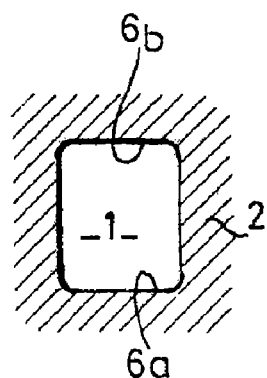
FIGS. 3A and 3B are sections on A and B of FIG. 3, respectively.
Figure 3B:
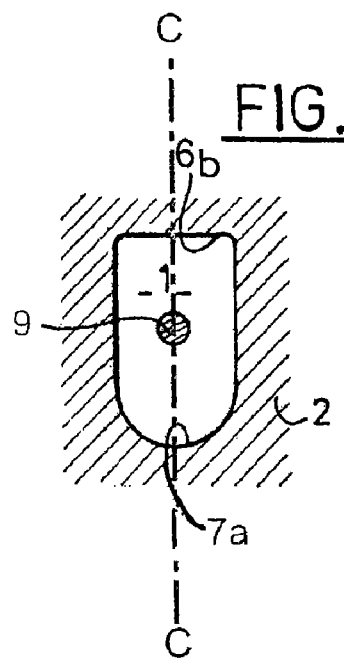

If reference is made to the sections 3A and 3B, it may be seen that the void 7a is confined to the foot of the lower face 6a of the duct. The other faces of the duct continue without pronounced transition up to near the lower end of the duct. The void 7a is revealed by machining, by the ogive 8, in the mass of the cylinder head 2 casting. FIG. 3B reveals its symmetry with respect to the plane of symmetry (C-C in FIG. 3B) of the duct 1, and of its lower face 6a.

According to the invention, the cylinder head can therefore be manufactured as follows: when the cylinder head is being cast, at least one as-cast duct is defined, with a planar lower face 6a connecting to an annular valve seat housing 4 via a rounded connecting region 7b which continues toward the inside of the duct. In a second step, the lower end of the duct is sized. Sizing is a machining operation performed on the void 7a and the rounded transition zone 7b.

In conclusion, it should be emphasized that the invention aims first and foremost to create fixed or variable "tumble". To this end, it proposes a change in the shape of the duct castings, while at the same time guaranteeing their robustness with respect to production spread. The new shape proposed has a recess 7a, on the lower part of the duct, within the mass of the cylinder head.

This arrangement makes it possible notably to continue the "square section" (that is to say the planar walls of the duct), as close as possible to the combustion chamber, particularly in the region downstream of the valve stem, so as to guide the flow in as straight a line as possible and encourage the front-of-valve flow rate with respect to the rear-of-valve. The "square section" (evident in FIG. 3A) can thus be maintained until further machining work.

The rounded fillet portion 7b of the casting makes it easier, using machining, to create a gentle transition, to the rear of the valve, between the "square section" and the, of necessity round, final section of the duct. To obtain this result, it is desirable for the ogive to have a profile suited to making the transition as gentle as possible. An ogive-shaped head is appropriate, insofar as it makes it possible to ensure the desired continuity between the slope of the top generatrix of the casting and that of the machined part.

The ogive angle needs to be adjusted not only with respect to the slope of the casting but also according to shifts of the casting resulting from casting spread. For example, if the casting "retreats" toward the rear of the valve, by comparison with the desired dimensions, the ogive angle needs to make it possible to avoid a downward step.

Hence, it should be emphasized that the invention allows a gain in "tumble" and in permeability while at the same time ensuring good robustness with respect to manufacturing spread.

The invention claimed is:

1. An intake duct cast as a recess in a combustion engine cylinder head and that opens into a combustion chamber of the engine at a lower end of the duct via an annular valve seat housing, comprising:
    over part of a length of the intake duct, a substantially planar lower face connected to the housing by a rounded transition zone and a void of rounded shape, within the mass of the cylinder head, positioned between the rounded transition zone and the housing; and
    a substantially planar upper face connected to the housing, wherein, at a cross-section of the intake duct taken at a position where the lower face is the void of rounded shape, the upper face is substantially planar.

2. The intake duct as claimed in claim 1, wherein the void is confined to the lower face of the duct.

3. The intake duct as claimed in claim 1, wherein the void is revealed within the mass of the cylinder head casting.

4. The intake duct as claimed in claim 2, wherein an as-cast shape of the cylinder head includes, at a bottom of the lower face of the duct, the rounded transition zone.

5. The intake duct as claimed in claim 4, wherein the void delineated at the lower face of the cylinder head is symmetric with respect to a plane of symmetry passing through the upper face and the lower face of the intake duct of the cylinder head.

6. The intake duct as claimed in claim 1, wherein other faces of the duct continue without pronounced transition right up to near the lower end of the duct.

7. A combustion engine, comprising:
    a cylinder head as claimed in claim 1; and
    a valve positioned at the lower end of the at least one intake duct of the cylinder head.

8. A method of manufacturing the combustion engine cylinder head according to claim 1, comprising:
    casting the cylinder head to include at least an as-cast intake duct with a planar upper face and a planar lower face connecting to an annular valve seat housing by a rounded connecting zone; and
    sizing the duct at its lower end to include a void of rounded shape in the lower face,
    wherein the sizing the duct is performed such that, at a cross-section of the intake duct taken at a position where the lower face is the void of rounded shape, the upper face is substantially planar.

9. The method of manufacture as claimed in claim 8, wherein the sizing the duct includes machining the lower face of the duct to form the void of rounded shape.

* * * * *

UNITED STATES PATENT AND TRADEMARK OFFICE
CERTIFICATE OF CORRECTION

| | | |
|---|---|---|
| PATENT NO. | : 8,402,937 B2 | Page 1 of 1 |
| APPLICATION NO. | : 12/594473 | |
| DATED | : March 26, 2013 | |
| INVENTOR(S) | : Laurence Mamy et al. | |

It is certified that error appears in the above-identified patent and that said Letters Patent is hereby corrected as shown below:

On the title page, Item (86), the PCT information is incorrect. Item (86) should read:

--(86) PCT No.:    PCT/FR2008/050515

§ 371 (c)(1),
(2), (4) Date: Mar. 1, 2010--

Signed and Sealed this
Twenty-eighth Day of May, 2013

Teresa Stanek Rea
*Acting Director of the United States Patent and Trademark Office*